United States Patent Office 3,705,860
Patented Dec. 12, 1972

3,705,860
ANTIFOAM AGENT
Jacque L. Duvall, San Clemente, Calif., assignor to BASF Wyandotte Corporation, Wyandotte, Mich.
No Drawing. Filed Sept. 23, 1970, Ser. No. 74,925
Int. Cl. B01d 17/00
U.S. Cl. 252—358          11 Claims

ABSTRACT OF THE DISCLOSURE

Improved antifoam agents particularly adapted for use in paper and pulp manufacturing processes are prepared from a mixture of non-polar oil, precipitated silica, metallo-organic catalyst, polymethylsiloxane and microcrystalline paraffin wax. These antifoam agents are useful also in latex paint manufacture and the like.

BACKGROUND OF THE INVENTION (1) Field of the invention

The present invention pertains to antifoam agents or defoamers. More particularly, the present invention concerns antifoam agents for aqueous acid or alkaline systems. Even more particularly, the present invention concerns antifoam agents particularly adapted for paper and pulp processes and the like.

(2) Prior art

In the processing of pulp in paper manufacture processors are generally confronted with the problem of excessive foaming. This foaming occurs during the pulp washing, screening and knotting operations of the paper making process. The reasons for the foaming is a violent agitation of a process liquor, which contains a high percentage of dissolved solids, usually, in an alkaline solution. Presently, this foaming problem is abated by the addition of defoaming agents to the process liquor at the early stages of the washing operation. However, many of the defoaming agents are limited in their appliction, that is, either immediate foam abatement occurs but without continuous foam prevention or the defoamer will provide continuous foam protection but is of no great use in dissipiating already formed foam.

Commercial defoamers containing silica have proven to be the most successful in the prevention and/or abatement of foam, but even these deformers have their limitations. For instance, some require spreading agents in order to promote the spreading of the silica throughout the system. In using spreading agents, the defoaming properties of the silica are reduced because the spreading agents produce additional foam in the system.

Another silica defoamer which is available has alleviated the problems inherent in the use of spreading agents. However, in the preparation of this defoamer it is necessary to heat a precipitated hydrophilic silica with a liquid hydrophobic polysiloxane oil in order to render the precipitated silica hydrophobic. This treatment requires a temperature of at least 150° C. for a period of at least 30 minutes, and usually much longer.

SUMMARY OF THE INVENTION

In accordance with the present invention there is provided an improved antifoam agent which overcomes the problems associated with the prior art and which consists essentially of: (1) water-insoluble non-polar oil (2), precipitated micro-fine silica, (3) metallo-organic catalyst, (4) polymethylsiloxane, and (5) microcrystalline paraffin wax.

The catalyst is employed to promote complexing of the siloxane and silica thereby rendering the latter hydrophobic in nature. Moreover, the catalyst greatly reduces the time necessary to prepare the present defoamers.

The antifoam agents of the present invention are generally prepared by mixing together the non-polar oil and the silica and with continuous stirring adding the catalyst thereto. Concurrent with the catalyst addition, the mixture is heated to a temperature of at least 110° C. and the polymethylsiloxane is then added to the mixture. The upper temperature limit is not critical hereto but is limited solely by practical economics and the possible degradation of the materials. Thus, a practical upper temperature is about 150 to 160° C.

After completing the addition of the polymethylsiloxane the mixture is maintained at this elevated temperature for about 1 to 4 hours after which time the paraffin wax is melted and blended into the mixture until it is all completely dissolved. The mixture is then passed through a homogenizer or colloid mill to break up any solid silica gel particles. Homogenization can be conducted at either the working temperature for preparing the compound, or the mixture can be cooled to a lower temperature and then homogenized.

For a more comprehensive discussion of the present invention reference is made to the following detailed description and examples thereof.

DESCRIPTION OF THE PREFERRED EMBODIMENT

In accordance with the present invention there is provided an antifoam agent, particularly adapted for use in paper and pulp processes, which can be efficaciously deployed in both aqueous-acid and aqueous-alkaline systems. The present antifoam agent generally consists of a mixture of: (1) non-polar oil, (2) precipitated micro-fine silica, (3) metallo-organic catalyst, (4) polymethylsiloxane, and (5) microcrystalline paraffin wax. More specifically, the present antifoam agents generally consist of, based on the total weight of the agent: (1) at least 66% by weight of non-polar oil, (2) at least 2% by weight of precipitated micro-fine silica, (3) from about 0.05 to 0.3% by weight of catalyst, (4) at least 0.2% by weight of polymethylsiloxane, and (5) at least 0.5% by weight of microcrystalline paraffin wax. Generally, the present antifoam agent or defoaming composition will consist essentially of: (1) from about 67.7% to 97.25% by weight of non-polar oil, (2) from about 2 to 20% by weight of precipitated micro-fine silica, (3) from about 0.05 to 0.3% by weight of catalyst, (4) from about 0.2 to 10% by weight of polymethylsiloxane, and (5) from about 0.5 to 2.0% by weight of microcrystalline paraffin wax. Preferably the antifoam agents consist essentially of, based on the total weight of the agent: (1) from about 83.3 to 92.1% by weight of non-polar oil, (2) from about 5 to 10% by weight of precipitated micro-fine silica, (3) from about 0.1 to 0.2% by weight of catalyst, (4) from about 2 to 5% by weight of polymethylsiloxane, and (5) from about 0.8 to 1.5% by weight of microcrystalline paraffin wax.

The antitfoam agents are prepared by a procedure generally outlined hereinbefore and which is detailed subsequently.

The non-polar oil ingredient is employed herein as a dispersing medium for a silica-siloxane complex which is discussed hereinafter. To be advantageously employed herein it is preferred that the non-polar oil be essentially water-insoluble, i.e. either water-insoluble or of limited solubility in water; this way the oil serves not only as a dispersing medium for the complex, but also contributes to the defoaming properties of the present antifoam agents by its interfacial spreading. As a general criterion, the non-polar oils contemplated herein are those liquid, water-insoluble oils having a surface tension less than about 35 to 40 dynes. Representative of the oils are substituted or unsubstituted aromatic hydrocarbons, such as benzene, toluene, naphthalene, minerol oil, white naphthenic mineral oil, paraffinic mineral oil, chloronaphthalenes, and the like. Other suitable non-polar oils, include aliphatic hydrocarbons, such as hexane, heptane, octane, etc.; vegetable and animal oils, such as olive oil, corn oil, soybean oil, castor oil, peanut oil, and the like; synthetic compounds, such as trifluorovinyl chloride polymer; silicone oils, such as polydimethylsiloxanes, fluorosilicones and the like; phosphate esters, such as tributyl phosphate; synthetic ester oils, such as dioctylazelate, and the like.

In fact any non-polar oil having the above-described physical attributes can be employed herein. It is preferred, however, to employ mineral oil and its analogs, such as naphthenic mineral oil, paraffinic mineral oil, white oil, and the like.

The precipitated micro-fine silicas employed herein can be selected from any one of a wide variety of well-known and commercially available products. These include acid or alkaline precipitated silicas, silica aerogels, and pyrogenic silicas. Representative of these silicas are, for example, the acid or alkaline precipitated silicas manufactured by Philadelphia Quartz Co. under the name Quso. Widely available silica aerogels are those marketed under the name Santocel, and pyrogenic silicas usually available by the name Cab-O-Sil. All of these tradenamed products are available in different grades, usually alphabetically designated after the trademark. Although all of the micro-fine silicas are contemplated for use herein, it is preferred in the practice of the present invention to employ either the acid or alkaline precipitated micro-fine silica.

The present invention contemplates the use of metalloorganic catalyst. By using a catalyst herein, the time required for preparing the present antifoam agents is drastically reduced. The time element encountered herein arises from the reaction of the silica and the siloxane wherein the siloxane becomes affixed to the silica particles to form a hydrophobic complex as the resultant. The catalyst promotes this reaction to the extent that reaction times may be decreased by about 60 to 70% while enabling decreased reaction temperatures. Representative of the metallo-organic catalysts which may be used herein, are, for example, zinc stearate, ferrous stearate, stannous octoate, ferrous octoate, dibutyltin dilaurate and the like. Preferably, zinc stearate is employed as the catalyst.

The polymethylsiloxanes that may be used in the practice of this invention are those that render the silica particles hydrophobic when affixed or complexed therewith. Generally, such polymethylsiloxanes have a viscosity of from about 10 to 30,000 centistokes at 25° C. A suitable polymethylsiloxane having these properties is polymethylhydrogensiloxane.

The final ingredient of the present antifoam agent is the microcrystalline paraffin wax. The wax acts as a stabilizer for the system by preventing the hydrophobic silica from settling out in the non-polar oil. Thus, inclusion of the wax renders the antifoam agent thixotropic. The paraffin waxes suitable for use herein are those having a molecular weight of from about 400 to 700, a melting point of from about 150° to 200° F., and a viscosity of from about 50 to 100 Saybolt units at 210° F. Such products are commercially available as evidenced by the microcrystalline paraffin wax sold by the Petrolite Corporation under the name Petrolite C-100.

The present antifoam agents are prepared by adding, with mixing, the silica to the non-polar oil. While continuing the mixing, the catalyst is added thereto in a steady stream and concurrently the mixture or batch is heated up. When the temperature of the batch reaches a temperature of about 110 to 130° C., the polymethylsiloxane is then incorporated into the mixture. Alternatively, the catalyst can be added after the siloxane addition, or contemporaneous therewith.

After the polymethylsiloxane addition is completed the resulting mixture is then maintained at this temperature for about 1 to 4 hours to ensure complete complexing between the silica and siloxane. While still maintaining this temperature, the microcrystalline wax is then melted and blended into the mixture. After all the ingredients have been mixed together, the mixture is then passed through a homogenizer or colloid mill to break up any silica gel particles which may have formed in the mixture. The homogenizing can be done at either the process temperature or after first cooling the mixture to a temperature below about 50° C., then passing it through the homogenizer. After this last step, the antifoam agent is ready for use.

Although the present invention has been described in terms of an antifoam agent for pulp and paper processes, it is to be understood, that other uses are also contemplated such as in latex paint manufacture and the like.

Following are specific examples of the present invention, which are to be construed as illustrative, rather than limitative, of the present invention. In the examples all parts are by weight absent indications to the contrary.

EXAMPLE I

An antifoam agent was prepared from the following ingredients:

| Ingredient: | Amount, in parts by weight |
|---|---|
| Non-polar Oil A [1] | 91.1 |
| Precipitated Silica B [2] | 5.0 |
| Catalyst C [3] | 0.2 |
| Polymethylsiloxane D [4] | 2.3 |
| Microcrystalline Wax E [5] | 1.4 |

[1] A mineral oil manufactured by Shell Oil Company under the name Shellflex 211 Oil.
[2] A precipitated silica sold by Philadelphia Quartz Co. under the name Quso G-30.
[3] Zinc Stearate.
[4] A polymethylhydrogensiloxane sold by Dow Chemical under the name Dow DC-117 Siloxane.
[5] A microcrystalline paraffin wax sold by Petrolite Corporation under the name Petrolite C-100.

The antifoam agent was prepared by blending, at room temperature, the non-polar oil, the precipitated silica and the zinc stearate catalyst. The blend was then heated to 120° C. and while maintaining this temperature, the polymethylsiloxane was slowly added thereto. The resulting mixture was then heated for 1 hour at about 120° C. to 130° C. to ensure complete complexing between the siloxane and the silica. After the one hour had elapsed the wax was then melted, dissolved and blended into the mixture. The mixture was then cooled and homogenized by agitation in a Waring blendor.

EXAMPLE II

An antifoam agent was prepared from the following ingredients:

| Ingredient: | Amount, in parts by weight |
|---|---|
| Non-polar Oil A | 92.8 |
| Precipitated Silica B | 5.0 |
| Catalyst C | 0.2 |
| Polymethylsiloxane D | 2.0 |
| Microcrystalline Wax E | 1.0 |

The antifoam agent was prepared by blending, at room temperature, the non-polar oil, the precipitates silica and the zinc stearate catalyst. The blend was then heated to 120° C. and while maintaining this temperature, the polymethylsiloxane was slowly added thereto. The resulting mixture was then heated for 1 hour at about 120° C. to 130° C. to ensure complete complexing between the siloxane and the silica. After the one hour had elapsed the wax was then melted, dissolved and blended into the mixture. The mixture was then cooled and homogenizetd by agitation in a Waring Blendor.

EAXMPLE III

An antifoam agent was prepared from the following ingredients:

Ingredient: Amount, in parts by weight
Non-polar Oil A _____ 91.0
Precipitated Silica B _____ 5.0
Catalyst C _____ 0.2
Polymethylsiloxane D _____ 2.3
Microcrystalline Wax E _____ 1.4
Organic Acid [1] _____ 0.1

[1] Glacial acetic acid added to mixture to ensure that catalytic effect is present in acidic systems.

The antifoam agent was prepared by blending, at room temperature, the non-polar oil, the precipitated silica and the zinc stearate catalyst. The blend was then heated to 120° C. and while maintaining this temperature, the polymethylsiloxane was slowly added thereto. The resulting mixture was then heated for 1 hour at about 120° C. to 130° C. to ensure complete complexing between the siloxane and the silica. After the one hour had elapsed the wax was then melted, dissolved and blended into the mixture. The mixture was then cooled and homogenized by agitation in a Waring Blendor.

EXAMPLE IV

To illustrate the effect of the catalyst in the preparation of the present antifoam agents, a plurality of analogous antifoam agents were prepared. The first antifoam agent, product I, was prepared from the following.

Ingredient: Amount, in parts by weight
Non-polar Oil A _____ 92.5
Precipitated Silica B _____ 5.0
Catalyst C _____ 0.25
Polymethylsiloxane D _____ 2.5

Product I was prepared by blending at room temperature the non-polar oil, the silica and the catalyst. The mixture was then heated to 110° C. at which temperature the siloxane was then slowly added to the mixture. The resulting product was then heated at 120° C. for one hour to ensure complete complexing.

Four similar antifoam agents, products II, III, IV, and V were then prepared from the same ingredients as product I and in the same manner, except that no catalyst was used. These four products differed solely from each other by reaction times used to prepare them, i.e. time for complexing the silica and the siloxane. Products II, III, IV and V were reacted for 1 hour, two hours, three hours and four hours, respectively.

After products I–V were prepared and aged for 30 minutes, they were then tested for foam inhibiting properties. This was achieved by adding a sample of each product to a black liquor solution at 160° C. and contained in a graduated cylinder; agitating the resulting solution, and after a selected time interval measuring the foam height in the cylinder. The results of these tests are shown below in Table I.

It is to be noted that in preparing these products no wax was incorporated into the formulation since the wax has no effect on foam properties, only thixotropy of the mixture.

TABLE I

| Product | P.p.m. | Foam height, in ml. 10 sec. after stopping agitation | 30 sec. after stopping agitation |
|---|---|---|---|
| I | 0 | 65 | 65 |
|   | 400 | 10 | 4 |
| II | 0 | 65 | 65 |
|   | 400 | 60 | 60 |
| III | 0 | 65 | 65 |
|   | 400 | 45 | 35 |
| IV | 0 | 65 | 65 |
|   | 400 | 30 | 12 |
| V | 0 | 65 | 65 |
|   | 400 | 15 | 4 |

From a review of the data in the table, the effect of the catalyst in reducing the time necessary to prepare the antifoam agent becomes apparent. Product V which most closely approximates product I in defoaming properties took four times longer to prepare than product I.

What is claimed is:

1. A defoaming composition for use in aqueous systems consisting essentially of
   (a) from about 67.7 to 97.25 percent by weight of non-polar oil,
   (b) from 2 to 20 percent by weight of precipitated microfine silica,
   (c) from about 0.05 to 0.3 percent by weight of zinc stearate metallo-organic catalyst,
   (d) from about 0.2 to 10 percent by weight of polymethylsiloxane, the siloxane being complexed with the silica to render the silica hydrophobic, and
   (e) from about 0.5 to 2.0 percent by weight of microcrystalline paraffin wax.

2. The composition of claim 1 wherein the non-polar oil constitutes from about 83.3 to 92.1% by weight of the total composition, the precipitated micro-fine silica constitutes from about 5 to 10% by weight of the total composition, the catalyst constitutes from about 0.1 to 0.2% by weight of the total composition, the polymethylsiloxane constitutes from about 2.0 to 5.0% by weight of the total composition, and the microcrystalline paraffin wax constitutes from about 0.8 to 1.5% by weight of the total composition.

3. The composition of claim 1 wherein the non-polar oil is mineral oil.

4. The composition of claim 1 wherein the polymethylsiloxane is polyhydrogenmethylsiloxane.

5. The composition of claim 1 wherein the non-polar oil is mineral oil, the metallo-organic catalyst is zinc stearate and the polymethylsiloxane is polyhydrogenmethylsiloxane.

6. The composition of claim 1 wherein the non-polar oil is a water-insoluble liquid having a surface tension not greater than 40 dynes.

7. A process for the preparation of the composition of claim 1 comprising.
   (a) mixing the precipitated silica into the non-polar oil,
   (b) adding with agitation the metallo-organic catalyst to the mixture obtained from (a),
   (c) heating the product of (b) to a temperature of at least 110° C.,
   (d) adding the polymethylsiloxane to the product of (c),
   (e) heating the product of (d) for at least one hour at a temperature of at least 110° C.,
   (f) blending the microcrystalline paraffin wax into the mixture, and
   (g) thereafter homogenizing the product.

8. The process of claim 7 wherein the product of step (d) is heated for a period of about one to four hours at a temperature ranging from about 110° to 150° C.

9. The process of claim 7 wherein the product of (b) is heated to a temperature ranging from 110° C. to 130° C.

10. The process of claim 9 wherein the catalyst is added to the mixture of (a) contemporaneous with the heating of said mixture.

11. The process of claim 9 which includes the step of cooling the product of (f) to a temperature below about 50° C. prior to homogenizing said product.

References Cited

UNITED STATES PATENTS

| | | | |
|---|---|---|---|
| 1,947,725 | 2/1934 | MacArthur et al. | 252—358 |
| 2,614,049 | 10/1952 | Swanson | 260—29.1 |
| 2,839,482 | 6/1958 | Geen et al. | 260—29.1 |
| 2,849,427 | 8/1958 | Kennedy et al. | 260—83.7 |
| 3,025,179 | 3/1962 | Holbein | 106—308 |
| 3,076,768 | 2/1963 | Boylan | 252—358 |
| 3,098,833 | 7/1923 | Soloman | 252—431 |
| 3,207,698 | 9/1965 | Liebling | 252—321 |
| 3,408,306 | 10/1968 | Boylan | 252—321 |

JOHN D. WELSH, Primary Examiner

U.S. Cl. X.R.

252—321, 309